(12) United States Patent
Wiener

(10) Patent No.: US 8,448,407 B1
(45) Date of Patent: May 28, 2013

(54) ROOF MOUNTING ASSEMBLY

(76) Inventor: Gregory M. Wiener, Alamo, CA (US)

( * ) Notice: Subject to any disclaimer, the term of this patent is extended or adjusted under 35 U.S.C. 154(b) by 0 days.

(21) Appl. No.: 13/323,089

(22) Filed: Dec. 12, 2011

Related U.S. Application Data

(60) Provisional application No. 61/516,173, filed on Mar. 30, 2011.

(51) Int. Cl.
*E04B 1/00* (2006.01)
*E04G 21/00* (2006.01)
*E04G 23/00* (2006.01)

(52) U.S. Cl.
USPC ..... 52/745.21; 52/173.2; 52/173.3; 52/741.4; 126/623; 248/237; 411/542

(58) Field of Classification Search
USPC .................. 52/173.3, 22, 263, 90.2, 27, 698, 52/701, 704, 705, 410, 409, 747.1, 412, 742.15, 52/745.12, 746.11, 745.21, 408, 741.4, 173.2; 248/205.1, 237; 126/623; 136/244; 411/542, 411/531, 82.2, 480, 396, 481, 397, 394, 399, 411/389, 378
See application file for complete search history.

(56) References Cited

U.S. PATENT DOCUMENTS

| | | | |
|---|---|---|---|
| 473,512 A | 4/1892 | Laird | |
| 756,884 A | 4/1904 | Parry | |
| 1,646,923 A | 10/1927 | Martens | |
| 1,925,263 A | 9/1933 | Levow | |
| 2,079,768 A | 5/1944 | Scott | |
| D139,568 S | 11/1944 | Hinchman | |
| 2,890,664 A | 6/1959 | Rachlin | |
| 2,925,976 A | 2/1960 | Martin | |
| D188,221 S | 6/1960 | Maro | |
| 3,141,532 A | 7/1964 | Runyan | |
| 3,182,762 A | 5/1965 | Syak et al. | |
| 3,408,780 A * | 11/1968 | Brister | 52/58 |
| 3,478,639 A * | 11/1969 | Gruca | 411/387.1 |
| 3,633,862 A | 1/1972 | Breen | |
| 3,682,507 A * | 8/1972 | Waud | 411/413 |
| 3,880,405 A | 4/1975 | Brueske | |
| 3,897,713 A * | 8/1975 | Gugle | 411/389 |

(Continued)

FOREIGN PATENT DOCUMENTS

| | | |
|---|---|---|
| CH | 204783 | 5/1939 |
| CH | 671063 A5 | 7/1989 |

(Continued)

OTHER PUBLICATIONS

"E-Ton Solar" Brochure, E-Ton Solar Tech. Co., Ltd. (Available at least as early as Oct. 20, 2011).

(Continued)

*Primary Examiner* — Josh Michener
*Assistant Examiner* — Chi Q Nguyen
(74) *Attorney, Agent, or Firm* — Young, Basile, Hanlon & MacFarlane, P.C.

(57) ABSTRACT

An apparatus for securing a roof-mounted structure to a roof is disclosed. The apparatus comprises: a shaft extending along a longitudinal shaft axis and including a first end opposing a second end; the first end including a roof fastening portion; the second end including a drive part and an anchor portion for securing the roof-mounted structure to the shaft; and the shaft including a radially projecting shoulder surface disposed between the first and second ends and oriented toward the first end.

19 Claims, 7 Drawing Sheets

U.S. PATENT DOCUMENTS

| | | | |
|---|---|---|---|
| 3,998,019 | A | 12/1976 | Reinwall, Jr. |
| 4,157,674 | A * | 6/1979 | Carlson et al. ............... 411/389 |
| 4,226,058 | A | 10/1980 | Riley |
| 4,269,012 | A | 5/1981 | Mattingly et al. |
| 4,321,745 | A | 3/1982 | Ford |
| 4,325,178 | A | 4/1982 | Pruehs |
| 4,348,846 | A | 9/1982 | Bellem |
| 4,367,864 | A | 1/1983 | Eldeen |
| 4,404,962 | A | 9/1983 | Zinn et al. |
| 4,554,773 | A | 11/1985 | Conley |
| D293,203 | S | 12/1987 | Hertensteiner |
| D294,904 | S | 3/1988 | Bleskachek |
| 4,763,456 | A | 8/1988 | Giannuzzi |
| 4,796,403 | A | 1/1989 | Fulton et al. |
| 4,892,429 | A | 1/1990 | Giannuzzi |
| 4,927,305 | A | 5/1990 | Peterson, Jr. |
| 5,082,412 | A | 1/1992 | Thomas |
| 5,127,205 | A | 7/1992 | Eidson |
| 5,207,043 | A | 5/1993 | McGee et al. |
| 5,217,191 | A | 6/1993 | Smith |
| 5,228,248 | A | 7/1993 | Haddock |
| 5,333,978 | A * | 8/1994 | Rives ............... 411/389 |
| 5,353,473 | A | 10/1994 | Sherick |
| 5,431,372 | A | 7/1995 | Kostelecky |
| 5,483,772 | A | 1/1996 | Haddock |
| 5,491,931 | A | 2/1996 | Haddock |
| D368,648 | S | 4/1996 | Losier |
| 5,528,872 | A | 6/1996 | Rotter |
| 5,547,226 | A | 8/1996 | Wentworth |
| 5,557,903 | A | 9/1996 | Haddock |
| 5,609,326 | A | 3/1997 | Stearns et al. |
| 5,613,328 | A | 3/1997 | Alley |
| 5,685,508 | A | 11/1997 | Smith |
| 5,687,936 | A | 11/1997 | Wilson |
| D388,136 | S | 12/1997 | Lecocq et al. |
| 5,692,352 | A | 12/1997 | Simpson |
| 5,694,721 | A | 12/1997 | Haddock |
| 5,715,640 | A | 2/1998 | Haddock |
| 5,746,029 | A * | 5/1998 | Ullman ............... 52/27 |
| 5,755,545 | A * | 5/1998 | Banks ............... 411/482 |
| 5,797,232 | A | 8/1998 | Larson |
| 5,813,649 | A | 9/1998 | Peterson et al. |
| 5,873,201 | A | 2/1999 | Fey |
| 5,882,043 | A | 3/1999 | Murphy et al. |
| D409,078 | S | 5/1999 | Bolt |
| 5,983,588 | A | 11/1999 | Haddock |
| D426,453 | S | 6/2000 | Stearns et al. |
| D428,799 | S | 8/2000 | Stearns et al. |
| D430,005 | S | 8/2000 | Stearns et al. |
| 6,164,033 | A | 12/2000 | Haddock |
| 6,193,455 | B1 | 2/2001 | Levey |
| 6,360,491 | B1 | 3/2002 | Ullman |
| 6,414,237 | B1 | 7/2002 | Boer |
| 6,470,629 | B1 | 10/2002 | Haddock |
| 6,514,005 | B2 | 2/2003 | Shiokawa et al. |
| 6,526,701 | B2 | 3/2003 | Stearns et al. |
| 6,536,729 | B1 | 3/2003 | Haddock |
| 6,669,274 | B2 * | 12/2003 | Barnard et al. ............... 296/193.1 |
| 6,718,718 | B2 | 4/2004 | Haddock |
| 6,868,647 | B2 | 3/2005 | Poldmaa |
| 7,013,612 | B2 | 3/2006 | Haddock |
| 7,069,698 | B2 | 7/2006 | Nee |
| 7,100,338 | B2 | 9/2006 | Haddock |
| 7,260,918 | B2 | 8/2007 | Liebendorfer |
| 7,434,362 | B2 | 10/2008 | Liebendoffer |
| 7,703,256 | B2 | 4/2010 | Haddock |
| D617,174 | S | 6/2010 | Schaefer et al. |
| 7,758,011 | B2 * | 7/2010 | Haddock ............... 248/500 |
| 7,762,027 | B1 * | 7/2010 | Wentworth et al. ............... 52/173.3 |
| 7,789,365 | B2 | 9/2010 | Durig et al. |
| 7,900,413 | B2 | 3/2011 | Stanley |
| 7,905,064 | B1 * | 3/2011 | Wentworth et al. ............... 52/173.3 |
| 7,935,202 | B2 | 5/2011 | Stanley |
| 8,033,703 | B2 * | 10/2011 | Bryce et al. ............... 362/549 |
| 8,122,648 | B1 * | 2/2012 | Liu ............... 52/58 |
| 8,151,522 | B2 * | 4/2012 | Stearns et al. ............... 52/58 |
| 2002/0088196 | A1 | 7/2002 | Haddock |
| 2002/0131842 | A1 | 9/2002 | Eriksson |
| 2002/0136595 | A1 * | 9/2002 | Schubring et al. ............ 403/296 |
| 2003/0101662 | A1 | 6/2003 | Ullman |
| 2003/0177706 | A1 | 9/2003 | Ullman |
| 2004/0173373 | A1 | 9/2004 | Wentworth et al. |
| 2007/0245636 | A1 | 10/2007 | Ayer et al. |
| 2007/0266672 | A1 | 11/2007 | Bateman et al. |
| 2007/0289233 | A1 | 12/2007 | Haddock |
| 2007/0295393 | A1 | 12/2007 | Cinnamon |
| 2008/0000173 | A1 | 1/2008 | Lenox et al. |
| 2008/0087275 | A1 | 4/2008 | Sade et al. |
| 2008/0121273 | A1 | 5/2008 | Plaisted et al. |
| 2008/0190047 | A1 | 8/2008 | Allen |
| 2008/0245404 | A1 | 10/2008 | DeLiddo |
| 2008/0302407 | A1 | 12/2008 | Kobayashi |
| 2008/0313976 | A1 | 12/2008 | Allen |
| 2009/0025314 | A1 | 1/2009 | Komamine et al. |
| 2009/0309388 | A1 | 12/2009 | Ellison |
| 2010/0192505 | A1 | 8/2010 | Schaefer et al. |
| 2010/0307074 | A1 | 12/2010 | Stearns et al. |
| 2011/0120047 | A1 | 5/2011 | Stearns et al. |
| 2011/0247279 | A1 | 10/2011 | Stearns et al. |
| 2011/0247295 | A1 | 10/2011 | Stearns et al. |

FOREIGN PATENT DOCUMENTS

| | | |
|---|---|---|
| DE | 3716491 A1 | 12/1988 |
| DE | 3723020 A1 | 1/1989 |
| GB | 666147 | 2/1952 |
| JP | 5346055 | 12/1993 |
| JP | 8193392 | 7/1996 |

OTHER PUBLICATIONS

"Fall Protection in Construction", OSHA Laws 3146; 1995.

"Genmounts Solar Racking Systems" Brochure (Available at least as early as Oct. 20, 2011).

MacDonald, "Inspecting the Scaffold" and Protective Roofing Products LTD. advertisement, (undated), Roofing Contractor 6.00.

"Mage Powertec Kits" Brochure, Mage Solar Projects, Inc. (Available at least as early as Oct. 20, 2011).

Non-Final Office Action, U.S. Appl. No. 12/727,726, mailed Sep. 16, 2011.

Non-Final Office Action, U.S. Appl. No. 13/166,542, mailed Sep. 16, 2011.

Non-Final Office Action, U.S. Appl. No. 13/166,378, mailed Sep. 19, 2011.

Non-Final Office Action, U.S. Appl. No. 12/914,209, mailed Sep. 20, 2011.

Omco Solar Brochure (Available at least as early as Oct. 20, 2011).

"Orion Solar Racking Jupiter Series Ground Mount System" Brochure, Orion Solar Racking (Available at least as early as Oct. 20, 2011).

"Phono Solar Tigo Energy Smart Module" Brochure, Phono Solar Technology Co., Ltd. (Available at least as early as Oct. 20, 2011).

"Polar Racking PolaRail Flush Mount Racking System" Brochure, Polar Racking Inc. Brochure, Schletter Inc. (Available at least as early as Oct. 20, 2011).

"PowAR Grip Product Sheet", A Raymond Tinnerman Industrial, Inc. (Available at least as early as Oct. 20, 2011).

Product Advertisement, "Alpine Snowguards/Setting the Industry Standard/Snow Guards for Every Roof Type" Mar. 27, 2000.

Product Advertisement, "Speedstand", Contractors Guide, Jun. 2000.

Product Advertisement—Sarna, Sarnafil Division (undated).

Product Description—"An Innovative Approach to Zero Roof Penetrations", Portable, Pipe Hangers, Inc., printed Jul. 2000.

Product Description—"Flat Roof Safety System", POHL Roof and Safety Systems, Securant, (undated).

Product Description—"Gecko—An Introduction", Gecko Safety Systems, Fall Arrest Protection, printed Jul. 2000.

Product Description—"Instruction and Specification Manual, Super Anchor: Fall Arrest Anchor. ARS-2.times.8 and ARS-2.times.12", 1993.

Product Description—"Super Anchor: Instruction/Specification Manual: Stainless Steel Fall Arrest Anchors ARS 2. times.8, ARS 2.times.12, I-Joist, Moveable ARS, Vertical Wall Anchor, and Custom Anchor", Mar. 2000.

Product Description—Anchor Guardrails, printed Aug. 2000.
Product Description—FLUX-Boy (undated).
Product Description—Gecko-An Introduction, Gecko Safety Systems, Ltd., printed Mar. 2000.
Product Description—Portable Pipe Hangers, Inc., Inter517face, Jun. 2000.
Product Description—Portable Pipe Hangers, printed Aug. 2000.
Prysmian Cables & Systems Photovoltaic (PV) System Products Product Sample and Brochure, Prysmian Power Cables and Systems USA, LLC (Available at least as early as Oct. 20, 2011).
"Quick Mount PV" Brochure (Available at least as early as Oct. 20, 2011).
Quickscrews International Corporation brochure (Available at least as early as Jun. 29, 2011).
"Rapid2+ Clamp Product Sheet", Schletter Inc. (Available at least as early as Oct. 20, 2011).
S-5! CorruBracket Brochure, Metal Roof Innovations, Ltd. (Available at least as early as Oct. 20, 2011).
S-5! Dirimak Brochure (Available at least as early as Jul. 18, 2011).
S-5! Dirimak Product Photographs (Available at least as early as Jul. 18, 2011).
"S-5! S-5-U and S-5-U Mini" Brochure, Metal Roof Innovations, Ltd. (Available at least as early as Oct. 20, 2011).
"S-5! VersaBracket" Brochure, Metal Roof Innovations, Ltd. (Available at least as early as Oct. 20, 2011).
"Schletter Professional Solar Mounting Systems Mounting and Project Planning" Brochure, Schletter Inc. (Available at least as early as Oct. 20, 2011).
"Solar Power International 11 SPI Daily News—Thursday, Oct. 20, 2011" Solar Power International 2011 (Oct. 20, 2011).
"Solar Security Fasteners" Brochure, Duncan Solar (Available at least as early as Oct. 20, 2011).
"Sunmodo Ez Roof Mount Installation Guide" (Available at least as early as Oct. 20, 2011).
"Sunmodo Ez Roof Mount L Foot for Shingle Roofs" Brochure (Available at least as early as Oct. 20, 2011).
"Sunmodo Ez Roof Mount Standoff for Metal Roofs" Brochure (Available at least as early as Oct. 20, 2011).
"Sunmodo Ez Roof Mount Standoff for Shingle Roofs" Brochure (Available at least as early as Oct. 20, 2011).
"Sunmodo Solar Mounting System" Brochure (Available at least as early as Oct. 20, 2011).
"Tecsun (UL) PV-Wire" Brochure, Prysmian Cables and Systems USA, LLC Brochure, Schletter Inc. (Available at least as early as Oct. 20, 2011).
TileTrac Product Photograph (Available at least as early as Jun. 8, 2011).
"TileTrac Tile Roof Structural Attachment" Brochure, Professional Solar Products, Inc., Copyright Mar. 2011.
UFD (Universal Fastening Disc) Installation Instructions and Design Drawings (Available at least as early as Jul. 14, 2011).
"Zilla Racking & Mounting Components" Zilla Corporation, Copyright 2011.
"Zilla the King of Racking Racking Systems" Brochure, Zilla Corporation (Available at least as early as Oct. 20, 2011).
"Zilla Zip Flashing Assembly Instructions" Zilla Corporation, Copyright 2011.
"Zilla Zip Single-Bolt Flashing Assembly" Brochure, Zilla Corporation, Copyright 2011.
"Zilla Zip Single-Bolt Flashing Assembly" Zilla Corporation, Copyright 2011.
Affordable Solar, UniRac PRO-PAK Standard Rail 204, available at least as early as Jan. 9, 2009.
Affordable Solar, Solar Panel Mounts & Solar Trackers for Solar Power Systems, available at least as early as Jan. 9, 2009.
Professional Solar Products Inc., FastJack Leveling Kits, available at least as early as Jan. 9, 2009.
Professional Solar Products Inc., FastJack Installation Manual, modified Sep. 10, 2007.
Professional Solar Products Inc., FastJack Commercial Fast Jack, Commercial Leveling Kit, Comparison Chart for the Fast Jack, available at least as early as Jan. 9, 2009.
Professional Solar Products Inc., Fast Jack, available at least as early as Jan. 9, 2009.
Schletter Solar Mounting Systems, "Product Sheet and Application Hints for FixPlan", http://int.mission-solar.eu/eu_store/index.php/eu_gb/aitdownloadablefiles/download/aitfile/aitfile_id/12960/, Date Unknown, 2 pp.

* cited by examiner

ROOF MOUNTING ASSEMBLY

CROSS REFERENCE TO RELATED APPLICATION

This application claims priority to U.S. Provisional Patent Application No. 61/516,173, filed Mar. 30, 2011, which is incorporated herein by reference in its entirety.

TECHNICAL FIELD

The embodiments disclosed herein relate in general to mounting assemblies and in particular to an apparatus and method for securing a roof-mounted structure to a roof.

BACKGROUND

A solar panel (also called a "photovoltaic panel") is an electrically interconnected assembly of solar cells used to generate electric power from sunlight that are mounted within a protective case. Owing to the relatively low power output efficiencies of current commercially available solar cells, several solar panels are typically required to generate a meaningful supply of electricity for use in commercial and residential applications. The panels are relatively large, heavy watertight structures and must be firmly secured to the building structure so as not to damage the structure itself or disrupt the watertight integrity of the roof. This is typically accomplished through the use of a plurality of mounting brackets or other mounting assemblies that connect the panels directly to the roof structure. In addition to firmly supporting the weight and size of the panels, the mounts must also allow the panels to be efficiently positioned to receive sunlight and must further be strong enough to withstand the adverse climatic elements that the roof itself must endure all year round, including high-winds, snow, ice, leaves and branches, etc.

Solar panels for residential use have been commercially available for decades, but only recently have solar cells become sufficiently power efficient and cost effective to compete with more conventional energy sources. Although the power savings resulting from a solar panel installation may not be realized for many years, the interest in solar energy has only grown in recent years and this has resulted in a sharp increase in the number of solar panel installations to residential homes and commercial buildings. To keep up with the busy demand for such installations, there has been much thought regarding the speed and efficiency of the installation process, including the tools and hardware used to install such a solar panel array to a roof structure keeping in mind the necessary safety requirements and local building codes. An important area of interest in this regard is the mounting assembly itself that is used to mechanically secure the panels to the roof structure.

The mounting assembly is arguably the most important component of the installation because each mount must provide a strong, watertight connection to the roof, must be adaptable to accommodate the greatest number of roofing structures and surface materials, should be low-profile, low in cost, and perhaps most importantly should be quick and easy to install and provide consistent predictable results. The speed for installation of these mounts is important because usually many of them have to be installed. A typical residential solar panel installation will require several mounts to be secured to the roof structure, so the time required to install a single mount becomes an important indicator in determining the time required to complete the installation project. The quicker to install one mount, the less time required to install many mounts. As to be expected, there are several different types of roof-mount assemblies commercially available today, but many appear to be complicated, costly and apparently require a relatively long time to install.

To illustrate some of the benefits of the present invention, an example of a commonly used prior art roof mounting assembly 10 is shown in FIGS. 1, 2 and 3 (labeled "Prior Art"). For this example, a roof 36 is shown including composition tiles 37, a protective layer 38 (tar paper), a support layer 39 (plywood) and framing rafters 40. Of course other types of mounts and other roof structures exist. The assembly 10 shown in these Figures is commercially known as a "FastJack" (a registered Trademark of Professional Solar Products, Inc.) and is available from Professional Solar Products, Inc., a company located in Oxnard, Calif.

As shown in the "Prior Art" Figures, the FastJack includes a machined-aluminum mounting block 12, a lag bolt 14, a coupler 16, a flashing element 18, a rubber sealing boot 20 and a connector bolt 22 used to attach a rail 24 to the coupler 16, as described below. Mounting block 12 is made from solid aluminum and includes a counter-bore 25 for receiving both the lag bolt 14, which is used to secure the mounting block 12 to the roof 36, and the coupler 16, which receives the connector bolt 22 to connect the rail 24 to the assembly 10. Coupler 16 includes external threads 26 at one end and a threaded bore 28 at an opposing end. The threaded bore 28 is sized and shaped to engage the threads of the connector bolt 22, whereas the external threads 26 selectively engage the threads 27 formed within the counter-bore 25. The flashing element 18 is somewhat conical in shape, with an integrally formed flat base 30 and an open upper end 32 defining a rim 34. When installed to a roof, flashing element 18 is positioned around the mounting block 12, coupler 16, connector bolt 22 and the lag bolt 14, with flat base 30 securely nestled under upper tiles or shingles 37, as shown in FIG. 3 (Prior Art). Rubber sealing boot 20 is also conical in shape and includes a lower end 42 opposing and an upper end 44. The lower end 42 is secured along the rim 34 to form a watertight seal. The upper end 44 includes an opening 46 that is sized and shaped to snugly receive the coupler 16 and thereby form a second watertight seal.

The following steps describe the installation of a mounting assembly 10:
1) Locate and mark the location of the roof rafters 40, for example by using a stud finder and chalk lines;
2) Mark the location on the roof for each mount, for example by using a measuring tape and chalk lines;
3) Drill an appropriately sized pilot hole for lag bolt 14 at each mark; the installer must drill straight (i.e., square with respect to a surface of the roof 36) into the roof 36 and into the underlying rafters 40;
4) Position the mounting block 12 so that the counter-bore 25 aligns with the pilot hole;
5) Secure the lag bolt 14 through the counter-bore 25 of the mounting block 12 and into the roof 36 so that the mounting block 12 becomes firmly secured to the surface of the roof 36;
6) Secure the coupler 16 to the counter-bore 25 of the mounting block 12 by engaging the threads 26 to the threads 27;
7) Position the flashing 18 over the secured mounting block 12 and use a flat bar to lift composition tiles or shingles 37 located above the mounting block 12 so that the flat base 30 of the flashing 18 can be nested below the upper tiles 37;
8) Position the opening 46 of the rubber sealing boot 20 around the coupler 16 so that the upper end of the coupler 16 protrudes above the boot 20; and 9) Use the connection bolt 22 to secure a rail member 24 to the coupler 16.

The prior art mounting assembly 10 described above is made up of several interconnecting components that have to be assembled in place on a roof surface, which is typically slanted. This is difficult for an installer because the installer must keep all the parts on hand on the roof and must carefully assemble the mounting assembly in place. Parts can easily slip and fall off the roof causing delay and possibly injury. The installer doesn't want to deal with this. The quicker the installer can secure the mounts to the roof, the less time the installer has to be on the roof and the safer the overall job will be. Also, so many interconnecting parts have to be manufactured to a relatively high degree of accuracy and this can only result in potential alignment issues during assembly (on the roof) and an increase in cost of manufacture.

Applicant has recognized a need for a simple, low-part roof mounting assembly that is very quick and easy to install on a roof, yet meets all the necessary supportive and sealing requirements. Such a mounting assembly would result in a safer installation since the installer would not be required to remain on the roof for long periods of time and would not have to perform relatively complicated assembly while perched in a precarious position on the roof.

SUMMARY

An embodiment of a roof-mounting assembly and a method of use are disclosed herein. In a preferred use, the disclosed mounting assembly can be used for securing a solar panel to a roof of the type that includes roof tiles and an underlying support structure.

In one aspect, an apparatus for securing a roof-mounted structure to a roof comprises a shaft. The shaft extends along a longitudinal shaft axis and includes a first end opposing a second end. The first end includes a roof fastening portion, and the second end includes a drive part and an anchor portion for securing the roof-mounted structure to the shaft. The shaft further includes a radially projecting shoulder surface disposed between the first and second ends and oriented toward the first end. According to this aspect, the apparatus can optionally include a first rigid washer. The first rigid washer has a first surface opposing a second surface and defines a through aperture sized to receive the roof fastening portion of the shaft, and at least a portion of the first surface is configured to engage the shoulder surface.

In another aspect, a method of securing a roof mounted structure to a roof having at least one roof tile overlying a roof support structure using a shaft and a washer is described. The shaft includes a roof fastening portion disposed at a first end of the shaft, a drive part and an anchor portion disposed at a second end of the shaft opposing the first end, and an integrally formed radially projecting shoulder surface disposed between the first and second ends and oriented toward the first end. The washer has a first surface opposing a second surface and defines a through aperture sized to receive the roof fastening portion of the shaft. The method comprises positioning the second surface of the washer adjacent to the roof and axially aligning the roof fastening portion with the through aperture, engaging the drive part to drive the roof fastening portion through the roof tiles and into the roof support structure such that the shoulder surface engages the first surface of the washer to urge the washer towards the roof and provide a watertight seal between the second surface and the at least one roof tile, and securing a roof mounted structure to the anchor portion.

In yet another aspect, an apparatus for securing a roof-mounted structure to a roof having a plurality of roof tiles overlying a roof support structure comprises a shaft and a washer. The shaft has a shaft diameter and extends along a longitudinal shaft axis and includes a first end opposing a second end. The first end includes a roof fastening portion having external wood threads configured for threaded engagement with the roof support structure. The second end includes a screw drive and an anchor portion, the screw drive having a head with a head diameter equal to or less then the shaft diameter and configured for engagement with a drive socket and the anchor portion having exterior machine screw threads configured for threaded engagement with the roof-mounted structure. A flange is integrally formed with the shaft and disposed between the first and second ends, the flange projecting radially from the shaft to define a shoulder surface oriented toward the first end. The washer has a first surface opposing a second surface, and defines a through aperture sized to receive the roof fastening portion of the shaft. At least a portion of the first surface is configured to engage the shoulder surface and the second surface is configured to provide a watertight seal between the washer and at least one of the roof tiles.

BRIEF DESCRIPTION OF THE DRAWINGS

The objects of the disclosed embodiment include providing a watertight mounting assembly for mounting equipment on top of a roof, and providing such a mounting assembly that uses few parts and is quick and easy to install on a roof.

These and other objects, features, advantages and other uses of the present apparatus and method will become more apparent by referring to the following detailed description and drawings in which.

DETAILED DESCRIPTION

Figure 1:
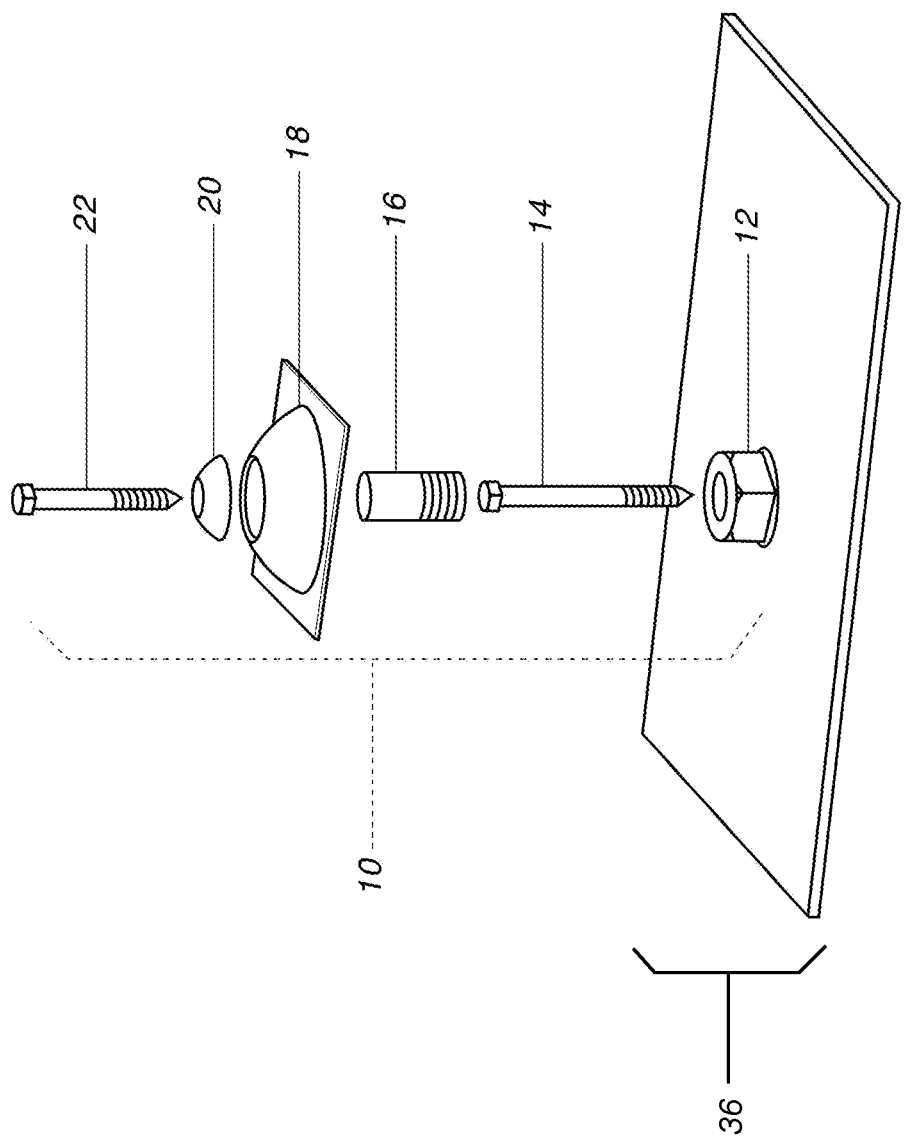
FIG. 1, labeled "Prior Art," is an exploded perspective view of a prior art roof mounting assembly including a mounting block, a lag bolt, a coupler, a flashing element, a sealing boot and a connector bolt.
Figure 2:
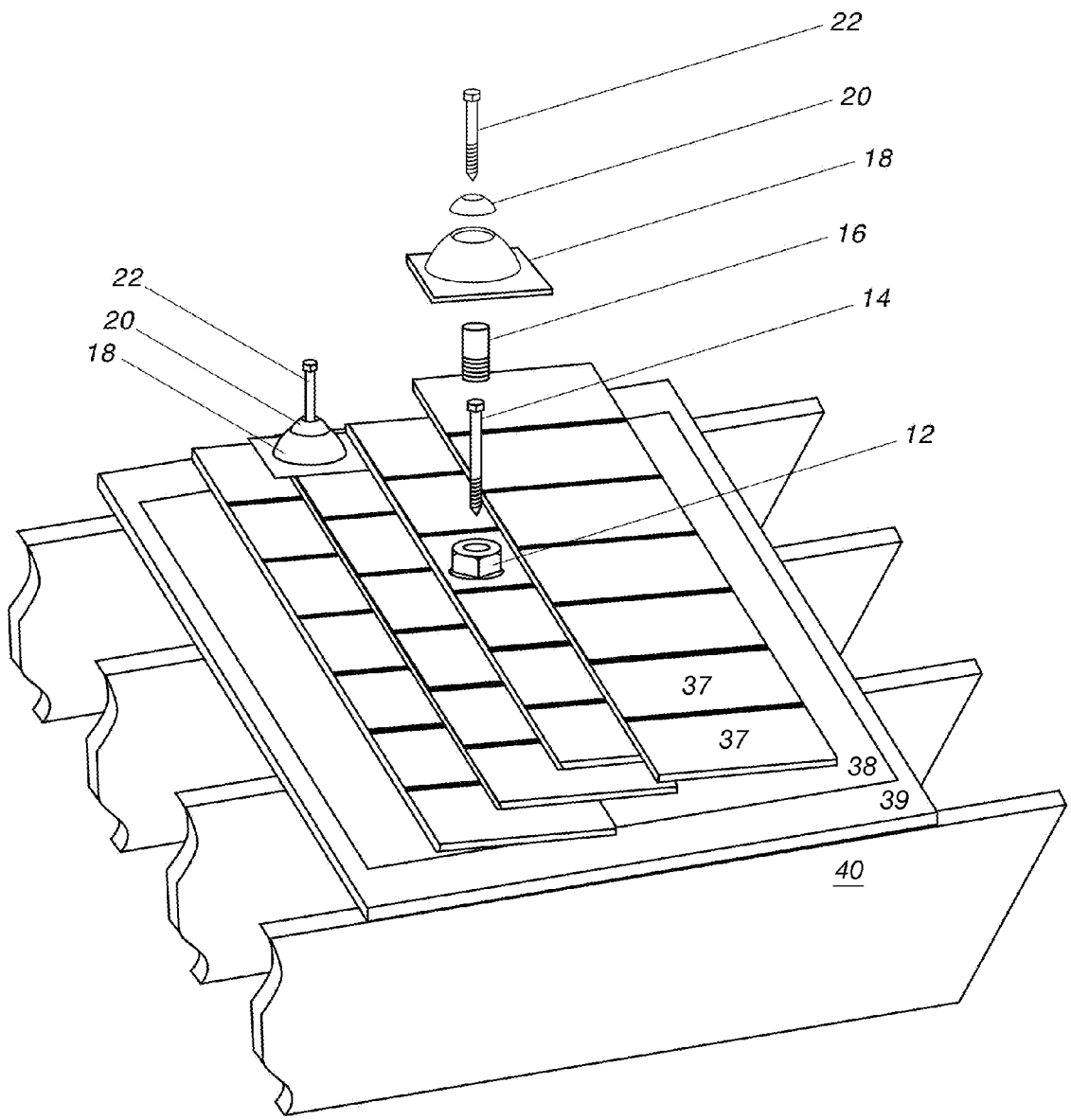
FIG. 2, labeled "Prior Art," includes an exploded perspective view of the prior art roof mounting assembly of FIG. 1 before assembly and attachment to a roof surface, and includes a perspective view of a fully assembled and secured mounting assembly.
Figure 3:
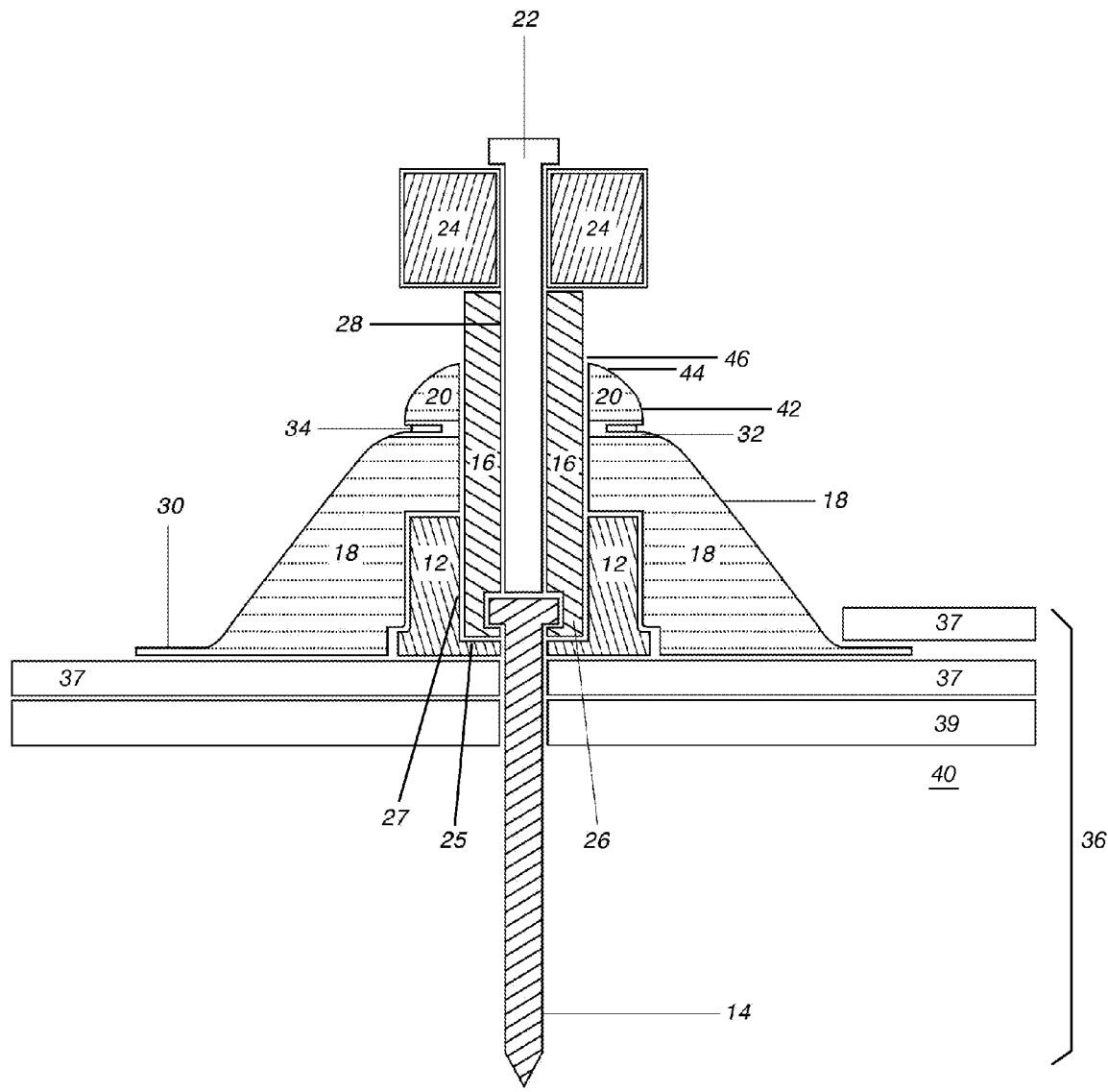
FIG. 3, labeled "Prior Art," is a sectional perspective view of the fully assembled and secured mounting assembly of FIGS. 1 and 2 showing details of the sealing relationship between the flashing element and the roof surface.
Figure 4:
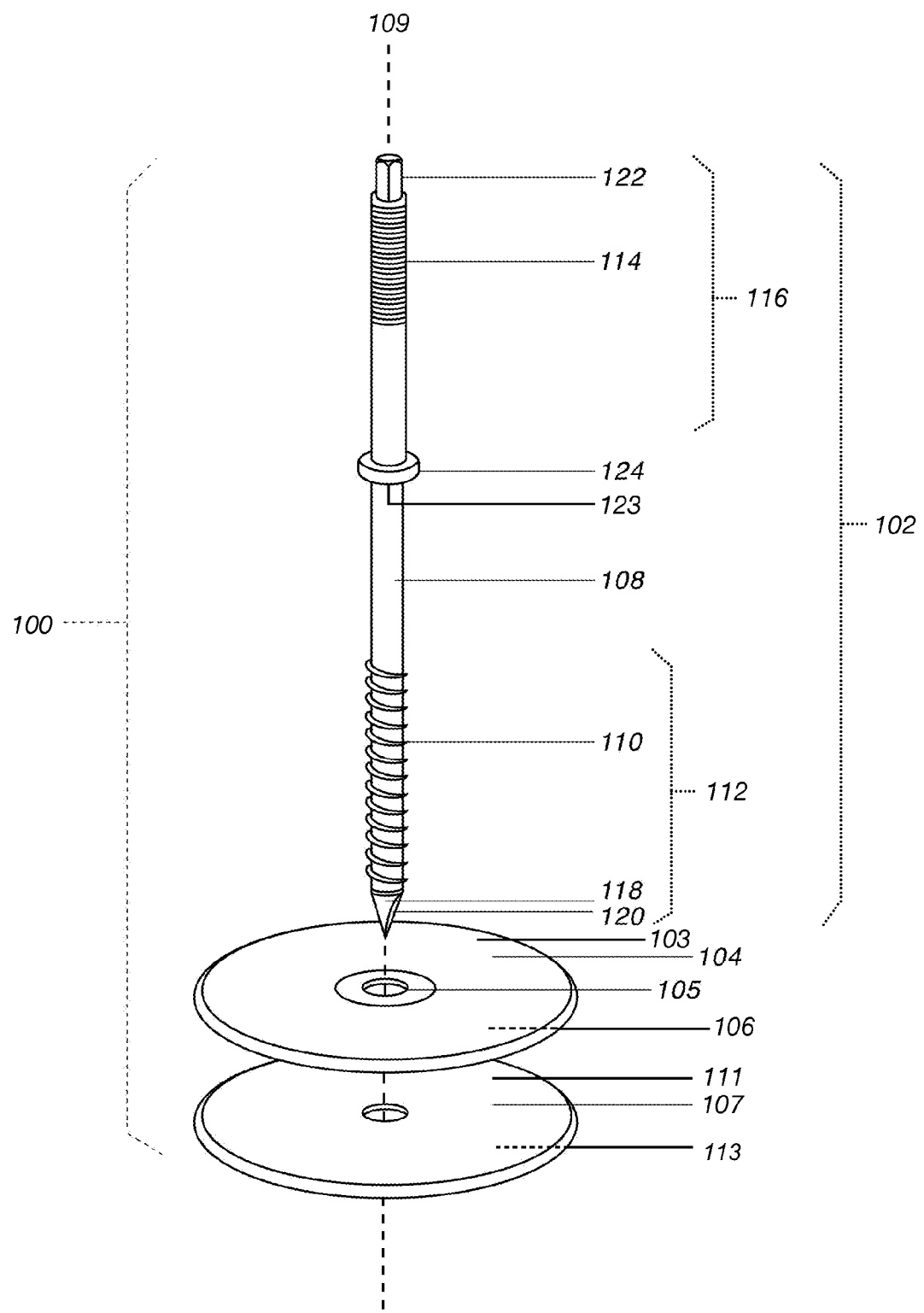
FIG. 4 is a perspective assembly view of a simplified roof mounting assembly according to an embodiment of the present invention prior to being installed to a roof.

A roof mounting assembly for securing a roof mounted structure, such as a solar panel, to a roof of the type that includes tiles and an underlying support structure is described below.

Referring to FIGS. 4-7, a mounting assembly 100 is shown. The mounting assembly 100 includes relatively few parts, including a hanger bolt 102, a first rigid washer 104 and a second sealing washer 107. The hanger bolt 102 includes a shaft 108 extending along a longitudinal shaft axis 109, with a first proximal end 112 opposing a second proximal end 116. The first end 112 includes a roof fastening portion 110 configured for securely fastening the shaft 108 to a roof. In the illustrated example, the roof fastening portion 110 includes external wood threads. However, other configurations know by those skilled in the art can be used for the roof fastening portion 110. For example, the roof fastening portion 110 can have threads of any configuration, or can alternatively be pin shaped. The first end 112 can further include a thread cutting portion 120, for example a self-boring cutting edge, at a tip 118. The second end 116 includes an anchor portion 114 that can be configured for engagement to a roof mounted structure (not shown). As shown, the anchor portion 114 can include external machine screw anchoring threads, although other configurations know by those skilled in the art can be used for the anchor portion 114.

The second end 116 further includes a drive part 122. The drive part is illustrated as in integrally formed drive head configured for engagement with a drive socket (not shown) that can be secured to an appropriate powered drive tool, such as a powered screwdriver or an impact hammer (not shown). In the illustrated embodiment of a hanger bolt 102 where the roof fastening portion 110 includes external threads, the drive head can be utilized to easily drive the bolt 102 into a roof structure at a desired angle and/or to remove the bolt 102 after it has been driven into a roof structure. The drive head is preferably shaped as a hex drive, but may be configured as any appropriately shaped drive, such as triangular drive, square drive, Torx® or other drives known by those skilled in the art. Where, as shown, the anchor portion 114 includes external anchoring threads, a diameter of the drive part 122 can be smaller than a diameter of the anchor portion 114 to allow engagement between the anchoring threads and an internally threaded component.

The shaft 108 includes a radially projecting shoulder surface 123 disposed between the first end 112 and the second end 116. The radially projecting shoulder surface 123 is oriented towards the first end 112 and configured to engage at least a portion of a first surface 103 of a rigid washer 104 positioned on the shaft 108 between the roof fastening portion 110 and the shoulder surface 123. The shoulder surface 123 is illustrated as being orthogonal to the shaft axis 109, but could alternatively be sloped or arcuate. In a preferred configuration, the first end 112 has a first shaft diameter adjacent the shoulder surface 123, and the shoulder surface 123 is defined by a flange 124. In the illustrated embodiment, the flange 124 is integrally formed with the shaft 108 and a diameter of the flange 124 is greater than the first shaft diameter. The flange 124 can be located at a predetermined location along the shaft 108 between the roof fastening portion 110 and the anchor portion 114, such that the anchor portions 114 of a plurality of mounting assemblies 100 would each extend a uniform distance from a roof structure when installed.

The hanger bolt 102 is preferably made from a strong appropriate metal, such as steel, but can be made from other materials, such as appropriate alloys, aluminum or stainless steel. Regardless of the material used, the hanger bolt 102 is preferably further corrosion treated, if necessary (depending on the material), such as by anodizing, galvanizing or plastic coating the bolt 102, by using a suitable paint, or by using other corrosion treatments. Obviously, most types of stainless steel are naturally resistant to corrosion and may require no protective coating or other corrosion treatment.

The hanger bolt 102 can be any appropriate size depending on the specific application and requirements. For most solar panel applications, Applicant prefers that hanger bolt 102 be about 153 mm long, with the shaft 108 having a diameter of about 7 mm. Where the anchor portion 114 and the roof fastening portion 110 are threaded, it is also preferred that both the anchor portion 114 and the roof fastening portion 110 be about 65 mm long and that the flange 124 be about 3 mm thick with an approximately 12 mm diameter.

The first rigid washer 104 is preferably made from a strong material, such as a metal, for example steel or stainless steel. As with the hanger bolt 102, the first washer 104 is preferably treated to resist corrosion. The first washer 104 defines a central opening 105, which is a through aperture sized to receive the roof fastening portion 110 of the shaft 108. That is, the central opening 105 is sized slightly greater than a diameter the roof fastening portion 110. The central opening 105 is also sized less than the diameter of the flange 124, such that the shoulder surface 123 engages the first surface 103 when axially aligned with the first washer 104. A thickness of the first washer 104 is about 8 mm, and the first washer 104 is preferably slightly concave with an outer diameter of about 76.2 mm and an inner diameter of about 8.6 mm.

The second sealing washer 107 can be disposed on the shaft 108 between a roof structure and the first washer 104. The second sealing washer 107 is constructed from a compliant material configured to provide a watertight seal when a second surface 113 of the second sealing washer 107 is urged towards a roof structure when a first surface 111 of the second sealing washer 107 is engaged by a second surface 106 of the first washer 104 as the shoulder surface 123 engages the first surface 103 of the first washer 104. The second sealing washer 107 is preferably made from an appropriate synthetic rubber, such as an EPDM (ethylene propylene diene Monomer—an M M-class rubber) having a durometer range between 60 and 80, and includes dimensions similar to those of the first washer 104—that is, an outer diameter of about 76.2 mm and an inner diameter of about 8.6 mm. However, the second sealing washer 107 preferably has a thickness of about 3.2 mm. Of course all these dimensions can and will vary depending on the particular application and specific requirements.

Figure 5:
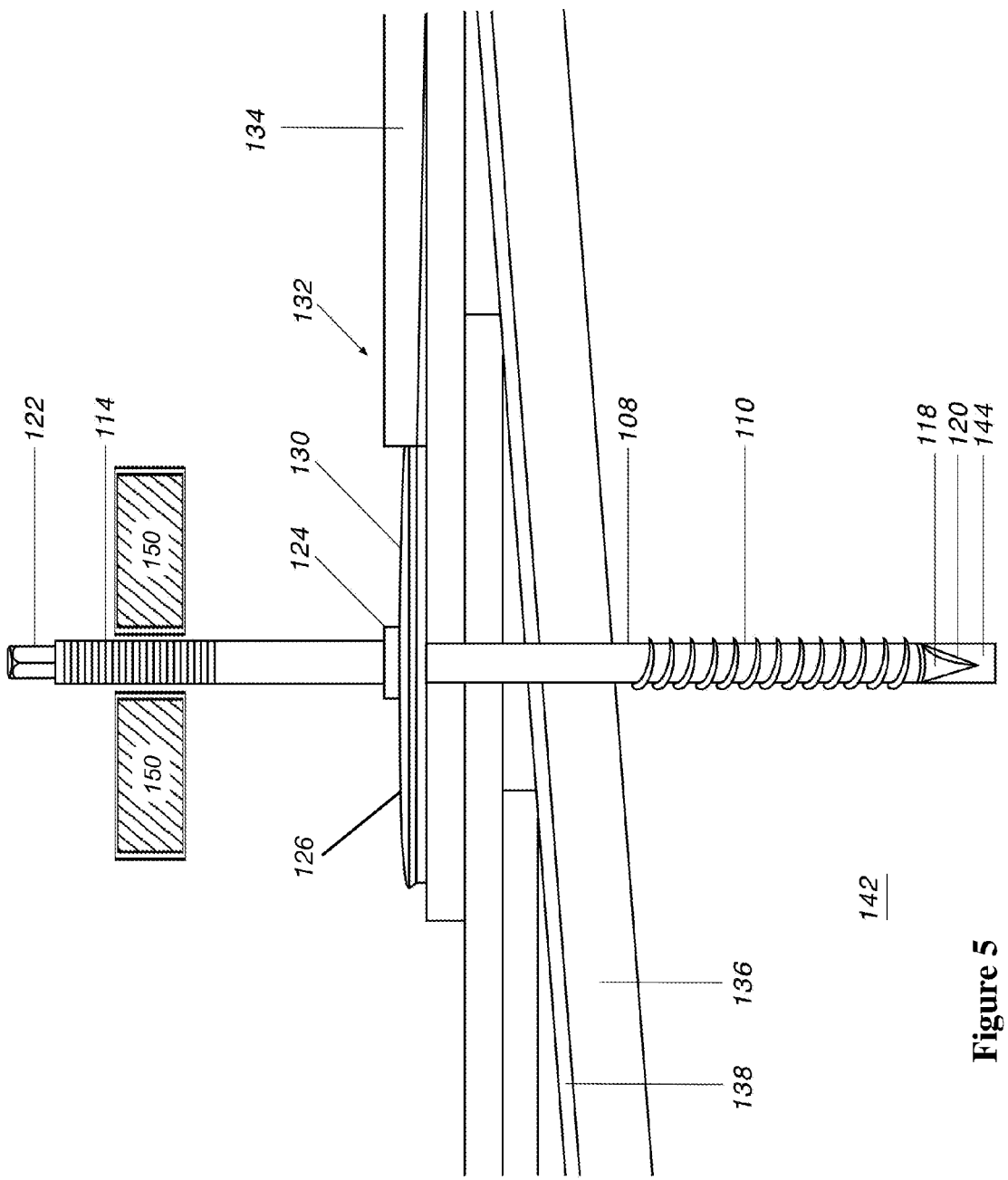
FIG. 5 is a sectional side view of the roof mounting assembly of FIG. 4 installed to a roof.
Figure 6:
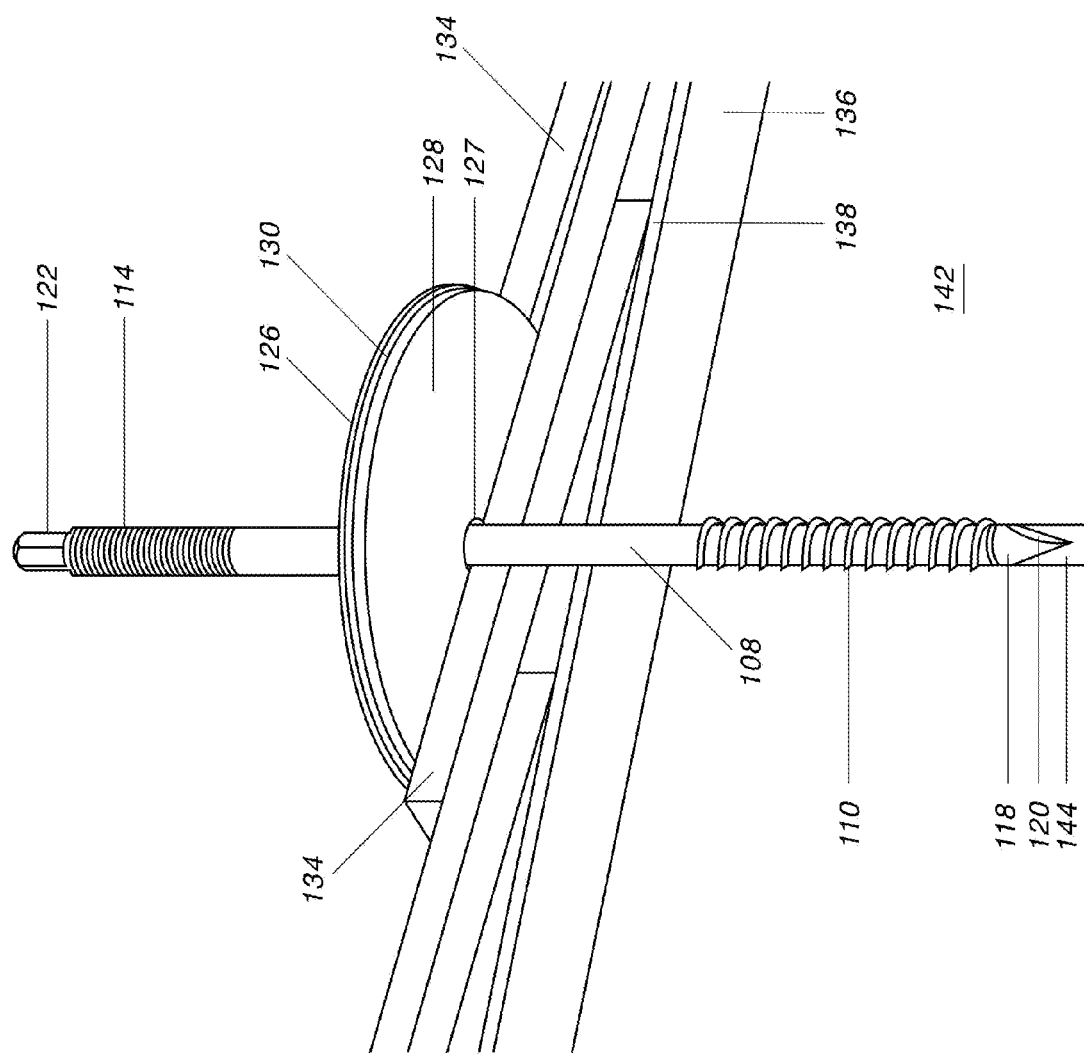
FIG. 6 is perspective view of the roof mounting assembly of FIG. 5 showing details of its securement to the roof.
Figure 7:
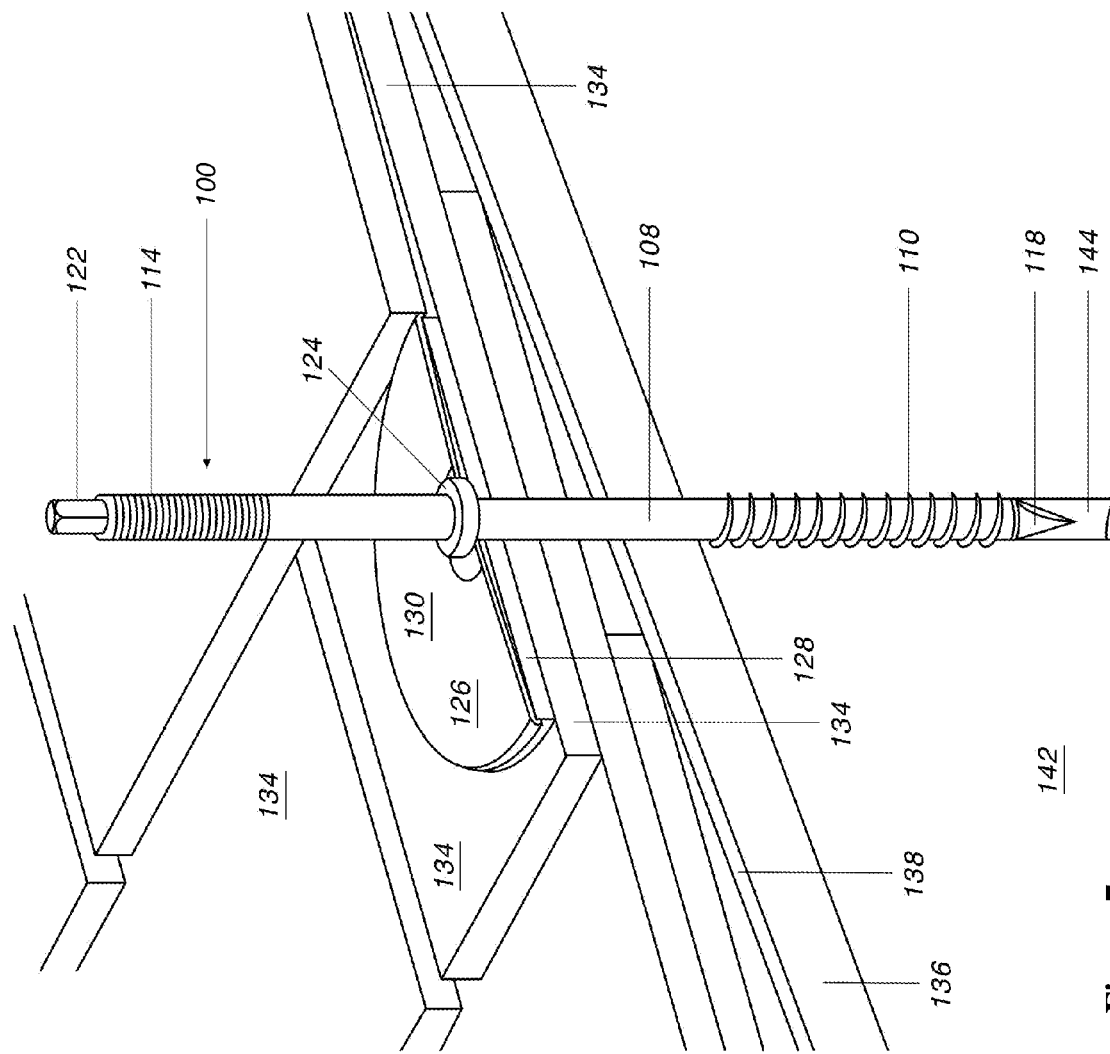
FIG. 7 is a partial sectional perspective view of the roof mounting assembly of FIG. 6, showing details of a compression washer and a seal.

Although the first washer 104 and the second sealing washer 107 are illustrated as separate components, the second sealing washer 107 can be bonded to the first washer 104, or the first washer 104 can be formed integrally with a suitable compliant material. For example, the first washer 104 can be provided with a rubber layer that can be forced into sealing contact with a roof structure by engagement of the flange 124 with the first surface 103 when the shaft 108 is driven into the roof structure. Use of a conventional EPDM bonded stainless steel washer 126 is illustrated in FIGS. 5-7. The washer 126 has a central opening 127, and an EPDM rubber layer 128 is effectively bonded to one side of a stainless steel concave compression washer 130.

Referring now to FIGS. 5, 6 and 7, the mounting assembly 100 is shown secured to a roof structure 132. For the purpose of explaining the installation procedure of the present invention, roof 132 includes composite roof tiles 134 (e.g., asphalt shingles) and an underlying support layer 136, which is typically made from ½" plywood. Located between the support layer 136 and the roof tiles 134 is a water-impervious layer 138, such as tar-paper or an appropriate plastic layer. As in conventional framing, rafter beams 142 are positioned below support layer 136 and are generally spaced a regular distance from each other (usually 16, 18, or 24 inches, measured between centers).

In use of the illustrated embodiment of the present invention:
1) The installer first measures out the roof and marks the locations where the mounting assemblies 100 are to be secured. The installer must make sure that each mark aligns perfectly with an underlying rafter beam 142.
2) The installer uses a drill (usually with an attached guide) and an appropriately sized drill bit to drill a pilot hole 144 through the roof tiles 134, the support layer 136, the water-impervious layer 138 and partway through the underlying rafter beam 142. The depth of pilot hole 144 from the surface of shingles 134 should be equal to the distance between the tip 118 the shoulder surface 123 defined by the flange 124.
3) The bonded washer 126 is positioned over the roof. The installer then aligns the shaft 108 with the central opening 127 of the bonded washer 126, inserts the tip 118 through the central opening 127 and then positions the tip 118 into the pilot hole 144.
4) Finally, the installer engages an appropriate drive socket to drive head 122 and uses a power driver to secure a wood threaded roof fastening portion 110 of shaft 108 into the roof layers following the pilot hole 144 to finally engage with the wood rafter beam 142. As the installer drives the hanger bolt 102 into the roof, eventually shoulder surface 123 of the flange 124 will contact the first upper surface of the bonded washer 126 and urge it downward (as the hanger bolt 102 drives itself into the roof during its driven clockwise rotation) until rubber layer 128 becomes pressed firmly against the outer layer of shingles 134. The rubber layer 128 will compress against the shingles 134 and form an effective seal with the roof surface so that rain water (or any water) cannot penetrate any of the roof layers along the installed hanger bolt 102. The concave shape of the washer 126 will help compress the rubber layer 128 along the periphery of the circular layer. This will ensure a tight water seal between washer 126 and the shingles 134.

Once all the mounting assemblies 100 are installed into the roof at the prescribed locations, the anchor portion 114 of each installed mounting assembly 100 remains accessible above the roof surface and can be used to secure a roof mounted structure including any appropriate racking member or frame structure 150 (shown in FIG. 5). A nut (not shown) and appropriate washers and/or lock washers can be used to secure the racking members or frame structures to each installed hanger bolt 102 by threadedly engaging included anchoring threads with a roof mounted structure.

As can be seen from the above, the described mounting assembly 100 can include as few as two parts (if a bonded washer is used, as is preferred); a hanger bolt 102 and a bonded washer 126. The use of an integral flange 124 obviates the need for any stop nuts that had been used in prior art mount systems. An integral flange 124 allows the present mount system to remain simple to manufacture and assemble, and also easy to install since there are fewer parts to assemble and keep track of. Once installed, racking members can be then secured to the accessible machine threads of the anchor portion 114.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for securing a roof-mounted structure comprising: a roof;
    a shaft extending along a longitudinal shaft axis and including a first end opposing a second end;
    the first end including a roof fastening portion secured within the roof;
    the second end including a drive part and an anchor portion for securing the roof-mounted structure to the shaft;
    the shaft including a radially projecting shoulder surface disposed between the first and second ends and oriented toward the first end; and
    a washer of sufficient size to form a watertight seal with a surface of the roof disposed on the shaft and positioned on the surface of the roof between the surface of the roof and the shoulder surface, the shoulder surface engaging the washer to urge the washer into sealing contact with the surface of the roof.

2. The apparatus of claim 1, further comprising:
    the washer including a rigid first washer having a first surface opposing a second surface and defining a through aperture sized to receive the roof fastening portion of the shaft, wherein at least a portion of the first surface is engaged by the shoulder surface.

3. The apparatus of claim 2, wherein the first washer has a conical cross section.

4. The apparatus of claim 2, further comprising:
    the washer including a compliant second sealing washer positioned between the first washer and the surface of the roof to provide the sealing contact with the surface of the roof.

5. The apparatus of claim 1, wherein the first end of the shaft has a first shaft diameter adjacent the shoulder surface, further comprising:
    a flange with a flange diameter greater than the first shaft diameter, wherein the flange defines the shoulder surface.

6. The apparatus of claim 5, wherein the flange is integrally formed with the shaft and the shoulder surface is a planar surface orthogonal to the shaft axis.

7. The apparatus of claim 1, wherein the drive part is a screw drive, further comprising:
    the roof fastening portion having external wood screw threads configured for threaded engagement with the roof.

8. The apparatus of claim 7, further comprising:
    the screw drive having a head configured for engagement with a drive socket.

9. The apparatus of claim 7, wherein the wood screw threads include a thread cutting portion at a terminal part of the first end.

10. The apparatus of claim 1, further comprising:
    the anchor portion having machine screw anchoring threads configured for threaded engagement with the roof-mounted structure.

11. The apparatus of claim 10, wherein the anchoring threads are included on an exterior of the second end along the anchoring portion.

12. The apparatus of claim 1, wherein the washer is a concave bonded washer having a rubber layer urged into sealing contact with the surface of the roof.

13. The apparatus of claim 12, wherein an outer diameter of the washer is approximately 3 inches and wherein the rubber layer is urged into sealing contact with the surface of the roof around a periphery of the washer.

14. The apparatus of claim 1, wherein:
an outer diameter of the washer is approximately 3 inches.

15. A method of securing a roof mounted structure to a roof having at least one roof tile overlying a roof support structure using a shaft and a washer, the shaft including a roof fastening portion disposed at a first end of the shaft, a drive part and an anchor portion disposed at a second end of the shaft opposing the first end, and an integrally formed radially projecting shoulder surface disposed between the first and second ends and oriented toward the first end, the washer having of sufficient size to form a watertight seal with the roof and having a first surface opposing a second surface and defining a through aperture sized to receive the roof fastening portion of the shaft, the method comprising:
positioning the second surface of the washer in contact with an outer surface of the at least one roof tile and axially aligning the roof fastening portion with the through aperture;
engaging the drive part to drive the roof fastening portion through the at least one roof tile and into the roof support structure such that the shoulder surface engages the first surface of the washer to urge the washer towards the outer surface of the at least one roof tile and provide a watertight seal between the second surface and the outer surface of the at least one roof tile; and
securing a roof mounted structure to the anchor portion.

16. The method of claim 15, wherein:
the roof fastening portion includes external threads configured for threaded engagement with the roof;
the drive part includes a screw drive; and
the step of engaging the drive part further comprises rotatably engaging the screw drive to drive the roof fastening portion through the roof tiles and into the roof support structure.

17. The method of claim 15, wherein:
the anchor portion includes machine screw threads; and
the step of securing the roof mounted structure further comprises threadingly engaging the roof-mounted structure with the machine screw threads.

18. An apparatus for securing a roof-mounted structure comprising: a roof having a plurality of roof tiles overlying a roof support structure;
a shaft having a shaft diameter extending along a longitudinal shaft axis and including a first end opposing a second end;
the first end including a roof fastening portion having external wood threads threadedly engaged with the roof support structure;
the second end including a screw drive and an anchor portion, the screw drive having a head with a head diameter equal to or less than the shaft diameter and configured for engagement with a drive socket and the anchor portion having exterior machine screw threads configured for threaded engagement with the roof-mounted structure;
a flange integrally formed with the shaft and disposed between the first and second ends, the flange projecting radially from the shaft to define a shoulder surface oriented toward the first end; and
a washer having an outer diameter of at least approximately 3 inches and having a first surface opposing a second surface forming a rubber layer, the washer defining a through aperture sized to receive the roof fastening portion of the shaft, the washer disposed on the shaft and positioned on an outer surface of at least one of the plurality of roof tiles between the outer surface of the at least one roof tile and the shoulder surface, wherein at least a portion of the first surface is engaged by the shoulder surface such that the second surface is urged into sealing contact with the outer surface of the at least one roof tile to provide a watertight seal between the washer and the outer surface of the at least one roof tile.

19. The apparatus of claim 18, wherein the washer is a concave bonded washer.

* * * * *